UNITED STATES PATENT OFFICE.

JEAN JACQUES GROSHEINZ, OF LOGELBACH, FRANCE.

IMPROVEMENT IN THE MANUFACTURE OF GLUCOSE SIRUPS AND SUGARS.

Specification forming part of Letters Patent No. 115,051, dated May 23, 1871.

*To all whom it may concern:*

Be it known that I, JEAN JACQUES GROSHEINZ, of Logelbach, in the Empire of France, have invented a new and useful Improvement in the Production of Glucose Sirup and Sugar; and I do hereby declare that the following is a full, clear, and exact description of the same.

Hitherto the means employed in the production of glucose, and especially of white sirup, in order to produce a good result, have required extreme care, and the application of the means to effect this is a delicate operation. The reason of this is, that it was necessary to remove the insoluble salts produced by neutralizing the acid matters with the earthy alkaline bases heretofore used for that purpose.

The object of my improved process is not to act upon the insoluble salts, but instead thereof to produce soluble salts which it will not be requisite to remove, since they can, without inconvenience, remain in the saccharine matter.

The process is as follows: The acid that has been employed in the decomposition of the fecula or other amylaceous matters is to be saturated with such a base as will produce a soluble salt which may remain in the saccharine matter. It is preferred to use hydrochloric or sulphuric acid for acting on the fecula, and for the alkaline base whereby the acid is to be neutralized I use either soda, potassa, ammonia, or magnesia. The proportion of acid to be used in manufacturing the glucose cannot be precisely fixed, as it will vary, first, according to the nature of the acid employed; second, according to the nature of the amylaceous matter; and, third, according to the degree of saccharification to be communicated to the product or the nature of the product (whether sirup or sugar) which it may be desired to obtain. Although, in order to understand the precise character of the present invention, it is not necessary to specify the exact proportion of the acid to be employed in the process, it may be stated that the quantity of acid may vary from one-half to two per cent. of the amylaceous matter.

The processes for converting amylaceous substances into either sugar or sirup are the same, and may be described as follows: The amylaceous substances are diluted with acidulated water, and then boiled until the matter arrives at the degree of saccharification (either as sirup or sugar) which it is desired to obtain. The degree of saccharification may be ascertained by means of tincture of iodine. Iodine, in contact with any saccharine matter, gives shades of color which vary from blue to yellow, according to the degree of saccharification produced. When the desired degree of saccharification has been attained the boiling process is to be stopped, and the second operation—that is, the saturation or neutralization of the acid by an alkaline base—is proceeded with. The quantity of the alkaline base to be added will of course depend upon the quantity of acid employed in the first part of the process. This base is added with care, in order to avoid any boiling over of the matter caused by the effervescence which will take place by the action of the alkali on the acid.

According to the ordinary mode of treatment the sulphuric acid used in the process of saccharification is neutralized by the addition of chalk or carbonate of lime, and thereby sulphate of lime is formed, which is in a great measure insoluble. A great portion of this sulphate of lime will be deposited if the liquid in which it is produced is sufficiently thin; but a certain portion of the sulphate of lime remains in the solution, and is partly precipitated when the saccharine matter arrives at a certain degree of concentration. From this it will be understood that the saccharine product will contain a certain amount of sulphate of lime, and will consequently be impure and unwholesome. If it be desired to get rid entirely of calcareous matter it must be extracted or removed by means of successive concentrations, which will have the effect of causing a deposit of the earthy matter. This result will therefore be obtained by long and tedious processes.

From the above explanation it will be understood that the present invention is founded solely on the principle of the saturation of the acid by a base capable of yielding a soluble salt, (which may remain in the product obtained,) instead of using a base which will produce an insoluble salt, as heretofore, and which hitherto has been removed subsequently, as already explained. It has been ascertained that the presence of these soluble salts, although capable of being recognized by analysis, exerts no injurious influence on the saccharine matter, and therefore need not be removed. The process, therefore, is much simplified, and a considerable saving of time is effected.

I claim as the invention which I desire to secure by Letters Patent—

Manufacturing glucose sirup and sugar by the use of acids in combination with alkaline bases which, by combining with the acids, will produce soluble salts, as herein set forth, and which soluble salts may, without inconvenience, remain in the substances that have been operated upon.

In witness whereof I, the said JEAN JACQUES GROSHEINZ, have hereunto set my hand and seal the twenty-seventh day of October, in the year of our Lord 1870.

J. J. GROSHEINZ. [L. S.]

Witnesses:
  G. A. HIRN,
    *Correspondant de l' Institut de France.*
  A. L. MOLKA,
    *Docteur en Médecine.*